United States Patent
Wu

(10) Patent No.: US 11,708,072 B2
(45) Date of Patent: Jul. 25, 2023

(54) SYSTEM, METHOD AND DEVICE FOR PLANNING DRIVING PATH FOR VEHICLE

(71) Applicant: Beijing Tusen Zhitu Technology Co., Ltd., Beijing (CN)

(72) Inventor: Nan Wu, Beijing (CN)

(73) Assignee: BEIJING TUSEN ZHITU TECHNOLOGY CO., LTD., Beijing (CN)

(*) Notice: Subject to any disclaimer, the term of this patent is extended or adjusted under 35 U.S.C. 154(b) by 115 days.

(21) Appl. No.: 17/001,130

(22) Filed: Aug. 24, 2020

(65) Prior Publication Data

US 2021/0046929 A1 Feb. 18, 2021

Related U.S. Application Data

(63) Continuation of application No. PCT/CN2018/105469, filed on Sep. 13, 2018.

(30) Foreign Application Priority Data

Feb. 24, 2018 (CN) .......................... 201810157707.1

(51) Int. Cl.
*B60W 30/095* (2012.01)
*G01C 21/00* (2006.01)
(Continued)

(52) U.S. Cl.
CPC ........ *B60W 30/0956* (2013.01); *B60W 30/10* (2013.01); *B60W 50/14* (2013.01);
(Continued)

(58) Field of Classification Search
CPC .. B60W 30/0956; B60W 30/10; B60W 50/14; B60W 2554/406; B60W 2050/146;
(Continued)

(56) References Cited

U.S. PATENT DOCUMENTS 9,266,473 B1 * 2/2016 Elwell ..................... H04W 4/48
9,898,011 B2   2/2018 Minowa et al.
(Continued)

FOREIGN PATENT DOCUMENTS

CN  103440779 A  12/2013
CN  103492968 A  1/2014
(Continued)

OTHER PUBLICATIONS

Office Action for CN Application No. 201810157707.1.
(Continued)

*Primary Examiner* — Tarek Elarabi
(74) *Attorney, Agent, or Firm* — Paul Liu; Julie J. Muyco; Perkins Coie, LLP

(57) ABSTRACT

A system, a method and a device for planning a driving path for a vehicle are described. In one example aspect, the device is configured to: analyze sense data to obtain positioning data of vehicles; assign vehicle transportation tasks to an unmanned vehicle and a manned vehicle in the predetermined area in accordance with a predetermined transportation task, each vehicle transportation task including a transportation start point and a transportation end point; plan driving paths for the unmanned vehicle and the manned vehicle based on the assigned vehicle transportation tasks, the vehicle positioning data and map data; transmit the assigned transportation task and the planned driving path for the unmanned vehicle to the unmanned vehicle; and transmit the assigned transportation task and the planned driving path for the manned vehicle to a mobile device corresponding to the manned vehicle.

20 Claims, 9 Drawing Sheets

(51) Int. Cl.
    *B60W 30/10*     (2006.01)
    *B60W 50/14*     (2020.01)
    *G05D 1/02*     (2020.01)
    *G08G 1/01*     (2006.01)
    *G08G 1/16*     (2006.01)

(52) U.S. Cl.
    CPC ....... *G01C 21/3815* (2020.08); *G05D 1/0214* (2013.01); *G08G 1/0133* (2013.01); *G08G 1/166* (2013.01); *B60W 2050/146* (2013.01); *B60W 2554/406* (2020.02)

(58) Field of Classification Search
    CPC ........ B60W 2050/1466; G08G 1/0133; G08G 1/166; G08G 1/0968; G01C 21/3815; G01C 21/3407; G05D 1/0214
    See application file for complete search history.

(56) References Cited

U.S. PATENT DOCUMENTS

| | | |
|---|---|---|
| 2001/0044697 A1 | 11/2001 | Kageyama |
| 2012/0143488 A1 | 6/2012 | Othmezouri et al. |
| 2013/0325210 A1* | 12/2013 | Palm .................... G05D 1/0289 701/2 |
| 2014/0081505 A1 | 3/2014 | Klinger |
| 2014/0236416 A1* | 8/2014 | Amirpour ........... G01M 17/007 701/29.6 |
| 2017/0068249 A1 | 3/2017 | Minowa et al. |
| 2017/0069214 A1 | 3/2017 | Dupray |
| 2017/0178505 A1 | 6/2017 | Ishikawa et al. |
| 2017/0341640 A1* | 11/2017 | Liu ...................... B62D 15/028 |
| 2018/0350238 A1* | 12/2018 | Atlinger ................ G08G 1/095 |

FOREIGN PATENT DOCUMENTS

| | | |
|---|---|---|
| CN | 105070076 A | 11/2015 |
| CN | 106652515 A | 5/2017 |
| DE | 102015007531.00 | 9/2016 |

OTHER PUBLICATIONS

International Application No. PCT/CN2018/105469, International Preliminary Report on Patentability dated Aug. 27, 2020, pp. 1-4.
International Application No. PCT/CN2018/105469, International Search Report and Written Opinion, dated Dec. 5, 2018, pp. 1-12.
Chinese Application No. 201810157707.1, Second Office Action dated Jan. 26, 2021 pp. 1-22.
Wuilleme, Cedric. European Application No. 18906960.2, Extended European Search Report dated Sep. 9, 2021, pp. 1-9.
Examination Report from corresponding European Patent Application No. 18906960.2, dated Jan. 26, 2023, (6 pages).

* cited by examiner

SYSTEM, METHOD AND DEVICE FOR PLANNING DRIVING PATH FOR VEHICLE

CROSS-REFERENCES TO RELATED APPLICATIONS

The present document is a continuation of and claims priority to International Patent Application No. PCT/CN2018/105469, filed on Sep. 13, 2018 which further claims the benefit of priority of Chinese Patent Application No. 201810157707.1, filed on Feb. 24, 2018. The content of the above-identified applications is incorporated herein by reference in its entirety.

TECHNICAL FIELD

The present disclosure relates to intelligent transportation, and more particularly, to a system, a method and a device for planning a driving path for a vehicle.

BACKGROUND

Currently, in some semi-enclosed application scenarios, such as coastal port areas, highway port areas, campuses, mining areas, etc., there are situations where unmanned vehicles and manned vehicles operate together. Manned vehicles include scheduled vehicles operating in certain areas, external vehicles, or engineering or maintenance vehicles in the area.

Unmanned vehicles and manned vehicles have different driving characteristics. For example, manned vehicles may adopt more aggressive driving strategies, while unmanned vehicles usually adopt more conservative driving strategies. Unmanned vehicles may not be able to understand the driving intentions of manned vehicles, so as to predict the driving behavior of the manned vehicle, such that the unmanned vehicles may not be able to determine safe and effective driving paths. Similarly, in some scenarios, drivers of manned vehicles may not be able to determine and predict the driving behavior of unmanned vehicles, resulting in disorders associated with their driving paths. Furthermore, it is more likely to cause traffic congestions which are difficult to resolve effectively. Therefore, both unmanned vehicles and manned vehicles have a problem that path planning cannot be performed effectively for them.

It can be seen that in the related art, in an environment where unmanned vehicles and manned vehicles operate together, there is a problem that path planning cannot be performed effectively for unmanned vehicles and manned vehicles.

SUMMARY

In view of the above, the present disclosure provides a system, a method and a device for planning a driving path for a vehicle, capable of solving the problem in the related art that path planning cannot be performed effectively for unmanned vehicles and manned vehicles in an environment where the unmanned vehicles and the manned vehicles operate together.

In an aspect, a system for planning a driving path for a vehicle is provided according to an embodiment of the present disclosure. The system includes an area sensing system, a planning device, and a mobile device corresponding to a manned vehicle. The area sensing system is configured to sense operating conditions of vehicles in a predetermined area to obtain sense data, and transmit the sense data to the planning device. The planning device is configured to: analyze the sense data to obtain positioning data of the vehicles; assign vehicle transportation tasks to an unmanned vehicle and a manned vehicle in the predetermined area in accordance with a predetermined transportation task, each vehicle transportation task including a transportation start point and a transportation end point; plan driving paths for the unmanned vehicle and the manned vehicle based on the assigned vehicle transportation tasks, the vehicle positioning data and map data; transmit the assigned transportation task and the planned driving path for the unmanned vehicle to the unmanned vehicle, such that the unmanned vehicle is enabled to move in accordance with the received driving path and complete the received transportation task; and transmit the assigned transportation task and the planned driving path for the manned vehicle to the mobile device corresponding to the manned vehicle. The mobile device is configured to receive the transportation task and the driving path from the planning device, and display the transportation task and the driving path, such that the manned vehicle is enabled to move in accordance with the driving path displayed by the mobile device and complete the transportation task displayed by the mobile device.

In another aspect, a method for planning a driving path for a vehicle is provided according to an embodiment of the present disclosure. The method includes: analyzing, by a planning device, sense data from an area sensing system to obtain positioning data of the vehicles, the sense data being obtained by the area sensing system sensing operating conditions of vehicles in a predetermined area; assigning vehicle transportation tasks to an unmanned vehicle and a manned vehicle in the predetermined area in accordance with a predetermined transportation task, each vehicle transportation task including a transportation start point and a transportation end point; planning driving paths for the unmanned vehicle and the manned vehicle based on the assigned vehicle transportation tasks, the vehicle positioning data and map data; transmitting the assigned transportation task and the planned driving path for the unmanned vehicle to the unmanned vehicle, such that the unmanned vehicle is enabled to move in accordance with the received driving path and complete the received transportation task; and transmitting the assigned transportation task and the planned driving path for the manned vehicle to a mobile device corresponding to the manned vehicle, such that the mobile device is enabled to display the transportation task and the driving path and the manned vehicle is enabled to move in accordance with the driving path and complete the transportation task.

In another aspect, a device for planning a driving path for a vehicle is provided according to an embodiment of the present disclosure. The device includes: an analyzing module configured to analyze sense data from an area sensing system to obtain positioning data of the vehicles, the sense data being obtained by the area sensing system sensing operating conditions of vehicles in a predetermined area; an assigning module configured to assign vehicle transportation tasks to an unmanned vehicle and a manned vehicle in the predetermined area in accordance with a predetermined transportation task, each vehicle transportation task including a transportation start point and a transportation end point; a planning module configured to plan driving paths for the unmanned vehicle and the manned vehicle based on the assigned vehicle transportation tasks, the vehicle positioning data and map data; a transceiver module configured to transmit the assigned transportation task and the planned driving path for the unmanned vehicle to the unmanned vehicle, such that the unmanned vehicle is enabled to move in accordance with the received driving path and complete the received transportation task, and transmit the assigned transportation task and the planned driving path for the manned vehicle to a mobile device corresponding to the manned vehicle, such that the mobile device is enabled to display the transportation task and the driving path and the manned vehicle is enabled to move in accordance with the driving path and complete the transportation task.

In another aspect, a device for planning a driving path for a vehicle is provided according to an embodiment of the present disclosure. The device includes a processor and at least one memory storing at least one machine executable instruction. The processor is operative to execute the at least one machine executable instruction to: analyze sense data from an area sensing system to obtain positioning data of the vehicles, the sense data being obtained by the area sensing system sensing operating conditions of vehicles in a predetermined area; assign vehicle transportation tasks to an unmanned vehicle and a manned vehicle in the predetermined area in accordance with a predetermined transportation task, each vehicle transportation task including a transportation start point and a transportation end point; plan driving paths for the unmanned vehicle and the manned vehicle based on the assigned vehicle transportation tasks, the vehicle positioning data and map data; transmit the assigned transportation task and the planned driving path for the unmanned vehicle to the unmanned vehicle, such that the unmanned vehicle is enabled to move in accordance with the received driving path and complete the received transportation task; and transmit the assigned transportation task and the planned driving path for the manned vehicle to a mobile device corresponding to the manned vehicle, such that the mobile device is enabled to display the transportation task and the driving path and the manned vehicle is enabled to move in accordance with the driving path and complete the transportation task.

According to the technical solutions provided by the embodiments of the present disclosure, a planning device for planning paths for vehicles in a predetermined area is provided. The planning device assigns vehicle transportation tasks to an unmanned vehicle and a manned vehicle in the predetermined area in accordance with a predetermined transportation task, plans driving paths for the unmanned vehicle and the manned vehicle based on the transportation task assigned to each vehicle, positioning data of the vehicles obtained by an area sensing system, and map data, transmits the assigned transportation task and the planned driving path for the manned vehicle to a mobile device corresponding to the manned vehicle, and transmits the assigned transportation task and the planned driving path for the unmanned vehicle to the unmanned vehicle, such that the manned vehicle is enabled to operate in accordance with the driving path received by the mobile device and the unmanned vehicle is enabled to operate in accordance with the driving path received by the vehicle and complete the assigned transportation task. In this way, unified path planning can be performed effectively for the unmanned vehicle and the manned vehicle that operate together in the predetermined area, thereby solving the problem in the related art that path planning cannot be performed effectively for unmanned vehicles and manned vehicles in an environment where the unmanned vehicles and the manned vehicles operate together.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. It is apparent to those skilled in the art that the figures described below only illustrate some embodiments of the present disclosure and other figures can be obtained from these figures without applying any inventive skills. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In view of the problem in the related art that path planning cannot be performed effectively for unmanned vehicles and manned vehicles in an environment where the unmanned vehicles and the manned vehicles operate together, an embodiment of the present disclosure provides a system for planning a driving path for a vehicle to solve this problem. In a system for planning a driving path for a vehicle according to an embodiment of the present disclosure, a planning device assigns vehicle transportation tasks to an unmanned vehicle and a manned vehicle in the predetermined area in accordance with a predetermined transportation task, each vehicle transportation task including a transportation start point and a transportation end point, plans driving paths for the unmanned vehicle and the manned vehicle based on the transportation task assigned to each vehicle, positioning data of the vehicles obtained by an area sensing system, and map data, transmits the assigned transportation task and the planned driving path for the manned vehicle to a mobile device corresponding to the manned vehicle, and transmits the assigned transportation task and the planned driving path for the unmanned vehicle to the unmanned vehicle, such that the manned vehicle is enabled to operate in accordance with the driving path received by the mobile device corresponding to the vehicle and the unmanned vehicle is enabled to operate in accordance with the driving path received by the vehicle and complete the assigned transportation task. In this way, unified path planning can be performed effectively for the unmanned vehicle and the manned vehicle that operate together in the predetermined area, thereby solving the problem in the related art that path planning cannot be performed effectively for unmanned vehicles and manned vehicles in an environment where the unmanned vehicles and the manned vehicles operate together.

The above is the core idea of the present disclosure. In order to allow those skilled in the art to better understand the technical solutions in the embodiments of the present disclosure, and to make the above objects, features and advantages of the embodiments of the present disclosure more apparent, the technical solutions in the embodiment of the present disclosure will be explained in further detail below with reference to the figures.

Figure 1A:
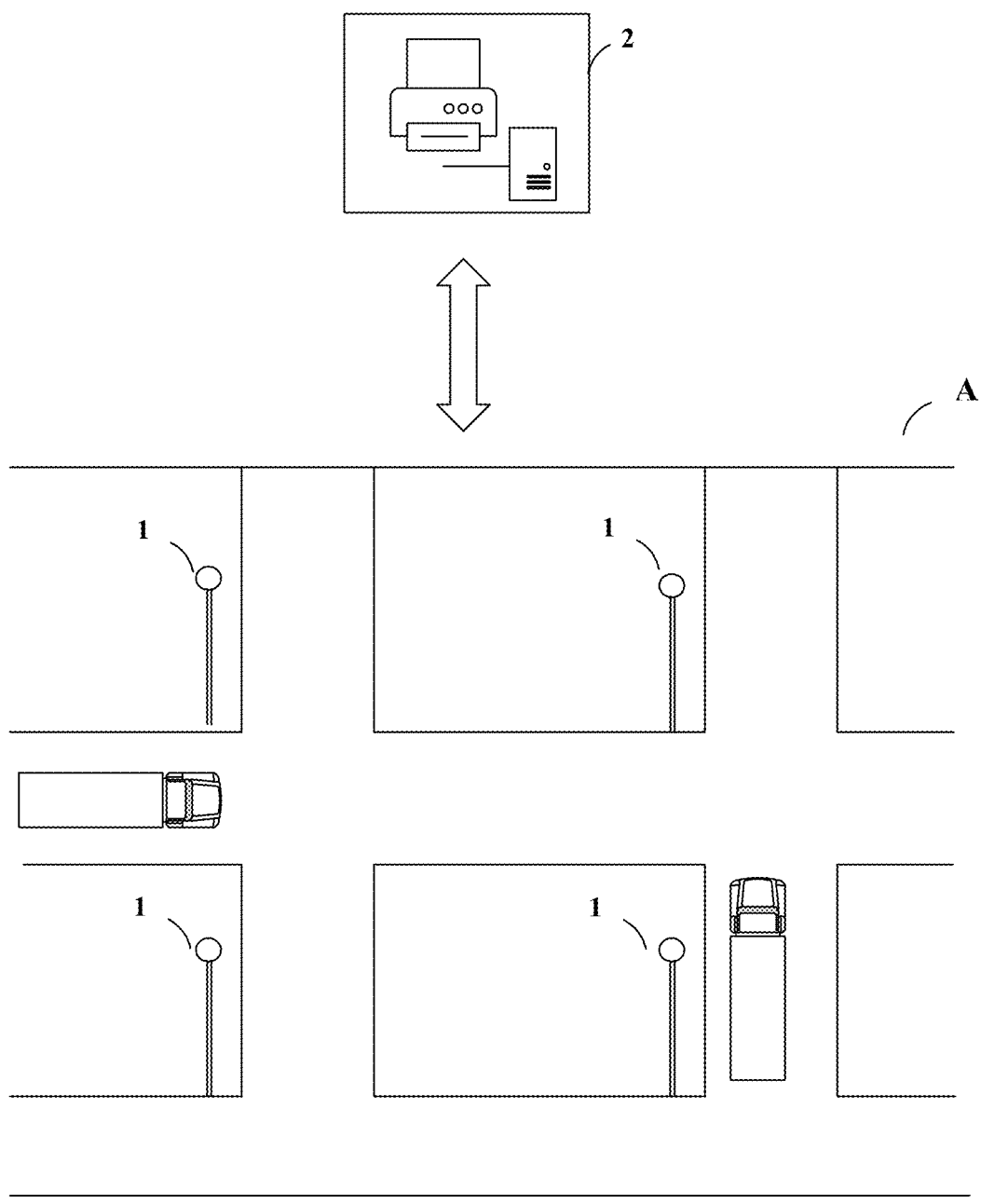
FIG. 1a is a schematic diagram showing a structure of a system for planning a driving path for a vehicle according to an embodiment of the present disclosure.

FIG. 1a shows a schematic diagram of a system for planning a driving path for a vehicle according to an embodiment of the present disclosure. The planning system is used to plan the driving paths of unmanned vehicles and manned vehicles in a predetermined area. The predetermined area can be a specified area or a designated area in various application scenarios, such as a freight area in a coastal port area, a freight area in a highway port area, or a related area in a campus or a mining area. The manned vehicles may include various manned vehicles in a predetermined area, including operating vehicles and engineering vehicles. For example, in a coastal port area, the manned vehicles may include manned container trucks, engineering vehicles, maintenance vehicles, and the like.

Figure 1B:
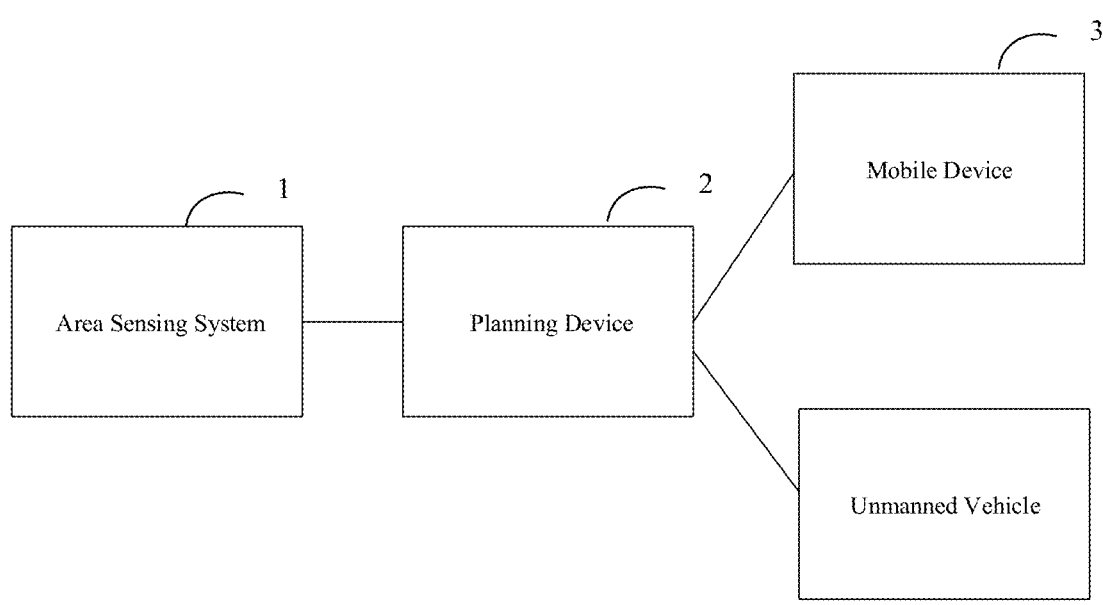
FIG. 1b is a block diagram showing a structure of a system for planning a driving path for a vehicle according to an embodiment of the present disclosure.

FIG. 1b shows a block diagram showing a structure of a system for planning a driving path for a vehicle according to an embodiment of the present disclosure. As shown in FIG. 1a, the system includes an area sensing system 1, a planning device 2, and a mobile device 3 corresponding to a manned vehicle (not shown).

The area sensing system 1 is provided in a predetermined area A. The area sensing system 1 includes at least one camera and/or at least one laser radar located on at least one monitoring point. The area sensing system 1 is configured to sense operating conditions of vehicles in the predetermined area A to obtain sense data. The area sensing system 1 can routinely monitor the operations of the vehicles in the predetermined area.

The planning device 2 may be a remote control terminal, or an on-site control terminal located in the predetermined area. In some application scenarios, the planning device 2 can be combined with an existing management control system in the scenarios, and can be provided as a management control module of the existing system or as a separate control terminal that can communicate with the existing system. For example, in an application scenario of a coastal port area, the planning device 2 may be a module in an existing Terminal Operation System (TOS). For example, the planning device 2 can be used as a vehicle management planning module in the TOS system and can communicate with a task management module in the TOS system for obtaining transportation task information and feeding back information on completion of the transportation task. Alternatively, the planning device 2 can be a separate vehicle planning management system connected to a TOS system and communicating with the TOS for e.g., receiving relevant information, such as transportation tasks, issued by the TOS and feeding back information on completion of the transportation tasks to the TOS.

The planning device 2 is configured to: analyze the sense data to obtain positioning data of the vehicles; assign vehicle transportation tasks to an unmanned vehicle and a manned vehicle in the predetermined area A in accordance with a predetermined transportation task, each vehicle transportation task including a transportation start point and a transportation end point; plan driving paths for the unmanned vehicle and the manned vehicle based on the assigned vehicle transportation tasks, the vehicle positioning data and map data; transmit the assigned transportation task and the planned driving path for the unmanned vehicle to the unmanned vehicle, such that the unmanned vehicle is enabled to move in accordance with the received driving path and complete the received transportation task; and transmit the assigned transportation task and the planned driving path for the manned vehicle to the mobile device 3 corresponding to the manned vehicle.

The mobile device 3 may be any electronic device with mobility and capable of communicating and displaying, such as a tablet computer (PAD), a Personal Computer (PC), a smart communication device, and the like. The correspondence between the mobile device 3 and the manned vehicle can be pre-established and may last for a long time, or can be temporarily established before the vehicle transportation task is assigned to the manned vehicle. That is, the mobile device 3 can be fixed in the manned vehicle or temporarily assigned to the manned vehicle.

The mobile device 3 is configured to receive the transportation task and the driving path from the planning device 2, and display the transportation task and the driving path, such that the manned vehicle is enabled to move in accordance with the driving path displayed by the mobile device and complete the transportation task displayed by the mobile device.

Further, on the basis of the above-mentioned functions, in some embodiments, the planning device 2 may be further configured to analyze the sense data, and determine a congested node of a road based on a predetermined congestion class; re-plan a driving path for a vehicle whose driving path includes a congested node having a predetermined congestion level, such that the re-planned driving path does not include any congested node having the predetermined congestion level; transmit the re-planned driving path to the unmanned vehicle such that the unmanned vehicle is enabled to move in accordance with the re-planned driving path; and transmit information on the congested node and/or the re-planned path to the mobile device corresponding to the manned vehicle, such that the mobile device is enabled to perform at least one of: displaying the received information on the congested node, providing a prompt or warning corresponding to the information on the congested node, or displaying the re-planned path.

In some other embodiments, the planning device 2 can be further configured to: analyze the sense data to determine posture data of each vehicle; predict a driving path and/or driving behavior of the manned vehicle based on the posture data of each vehicle, to obtain a predicted path and/or predicted behavior; and transmit the predicted path and/or predicted behavior of the manned vehicle to an unmanned vehicle within a predetermined range from a current position of the manned vehicle, such that the unmanned vehicle is enabled to determine a vehicle operation adjustment operation based on the received predicted path and/or predicted behavior of the manned vehicle and execute the determined vehicle operation adjustment operation.

In some other embodiments, the mobile device 3 may further include a positioning unit (such as a GPS positioning unit), and an Inertial Measurement Unit (IMU), or any other device that can achieve positioning and posture measurement. The mobile device 3 can be further configured to: generate vehicle pose data based on a measurement result from the positioning unit and a measurement result from the inertial measurement unit while the manned vehicle is moving, and transmit the vehicle pose data of the manned vehicle to the planning device 2. The planning device 2 can be further configured to receive the vehicle pose data of the manned vehicle from the mobile device. In this case, the planning device 2 being configured to predict the driving path and/or driving behavior of the manned vehicle may include the planning device 2 being configured to predict the driving path and/or driving behavior of the manned vehicle based on the vehicle pose data of the manned vehicle and the posture data of the manned vehicle, to obtain the predicted path and/or predicted behavior.

The operation principle of the planning device 2 will be described below.

Figure 2:
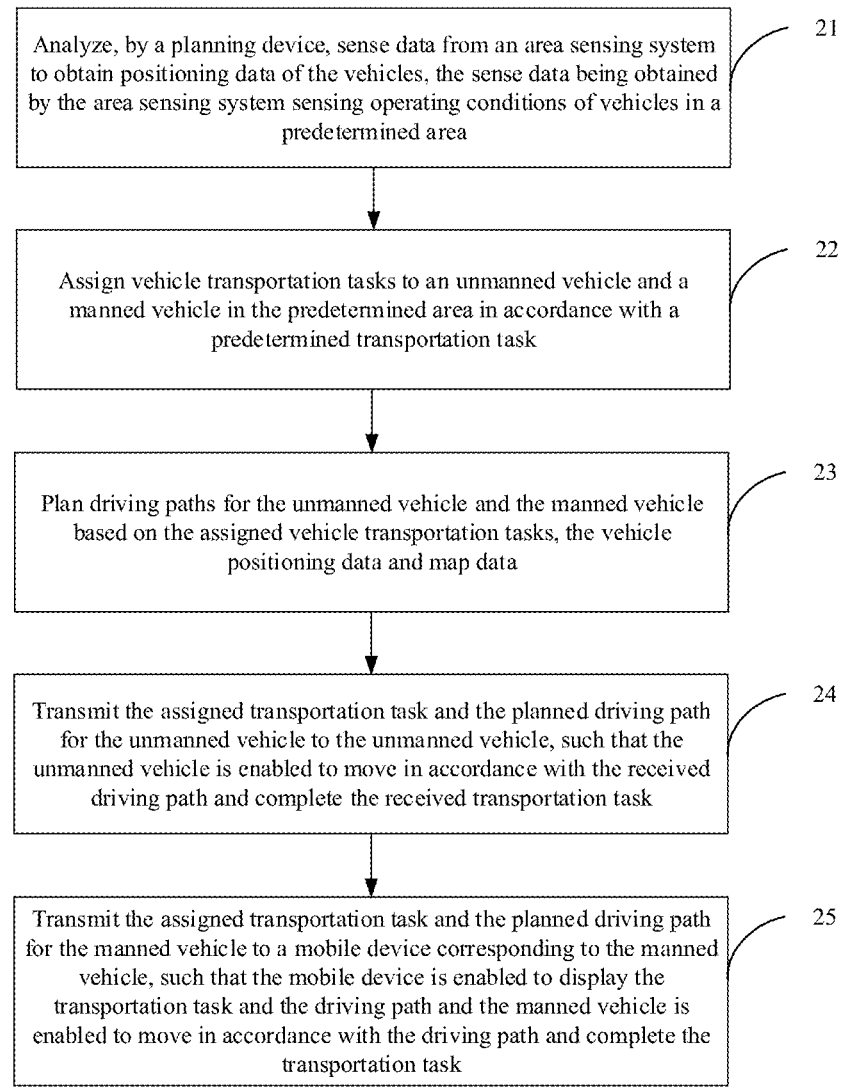
FIG. 2 is a flowchart illustrating a method for planning a driving path for a vehicle according to an embodiment of the present disclosure.

FIG. 2 shows a process flowchart of a method for planning a driving path for a vehicle according to an embodiment of the present disclosure. The method includes the following steps.

At step 21, a planning device analyzes sense data from an area sensing system to obtain positioning data of the vehicles. The sense data is obtained by the area sensing system sensing operating conditions of vehicles in a predetermined area.

At step 22, vehicle transportation tasks are assigned to an unmanned vehicle and a manned vehicle in the predetermined area in accordance with a predetermined transportation task. Each vehicle transportation task includes a transportation start point and a transportation end point.

At step 23, driving paths are planned for the unmanned vehicle and the manned vehicle based on the assigned vehicle transportation tasks, the vehicle positioning data and map data.

In some embodiments, the planning device may also perform the path planning according to some other rules or strategies, for example:

Strategy 1: The driving paths can be planned for the manned vehicle and the unmanned vehicle in accordance with predetermined road use permissions and/or road use priorities of the unmanned vehicle and the manned vehicle, respectively.

Strategy 2: The sense data can be analyzed to determine traffic data for a current road, and the driving paths can be planned for the manned vehicle and the unmanned vehicle based on the traffic data for the current road, respectively.

Strategy 3: The sense data can be analyzed to determine a congested node of the current road, and the driving paths can be planned for the manned vehicle and the unmanned vehicle based on the congested node of the road.

Any one or combination of the above strategies can be combined with the assigned vehicle transportation tasks, the vehicle positioning data, and the map data, for use by the planning device to systematically plan the driving paths for the unmanned vehicle and the manned vehicle. In a specific application scenario, other strategies can also be included, which can be specifically set depending on requirements of the application scenario.

The present disclosure is not limited to any specific method for planning the driving paths, which can be set depending on the requirements of specific application scenarios. Any path planning method, known in the related art or developed in the future, can be used.

At step 24, the assigned transportation task and the planned driving path for the unmanned vehicle are transmitted to the unmanned vehicle, such that the unmanned vehicle is enabled to move in accordance with the received driving path and complete the received transportation task.

At step 25, the assigned transportation task and the planned driving path for the manned vehicle are transmitted to a mobile device corresponding to the manned vehicle, such that the mobile device is enabled to display the transportation task and the driving path and the manned vehicle is enabled to move in accordance with the driving path and complete the transportation task.

According to the technical solution provided by the embodiments of the present disclosure, a system for planning a driving path for a vehicle is provided. A planning device assigns vehicle transportation tasks for a manned vehicle and an unmanned vehicle, and plans driving paths for the manned vehicle and the unmanned vehicle. The assigned vehicle transportation task and the planned driving path for the unmanned vehicle are assigned to the unmanned vehicle, and the assigned vehicle transport task and the planned driving path for the manned vehicle are assigned to a mobile device corresponding to the manned vehicle, such that the unmanned vehicle and the manned vehicle can move in accordance with the driving paths planned by the planning device and complete the transportation tasks. In this way, it is possible to perform path planning for unmanned vehicles and manned vehicles, respectively, in an environment where the unmanned vehicles and the manned vehicles operate together, thereby solving the problem in the related art that path planning cannot be performed effectively for unmanned vehicles and manned vehicles in an environment where the unmanned vehicles and the manned vehicles operate together.

Figure 3:
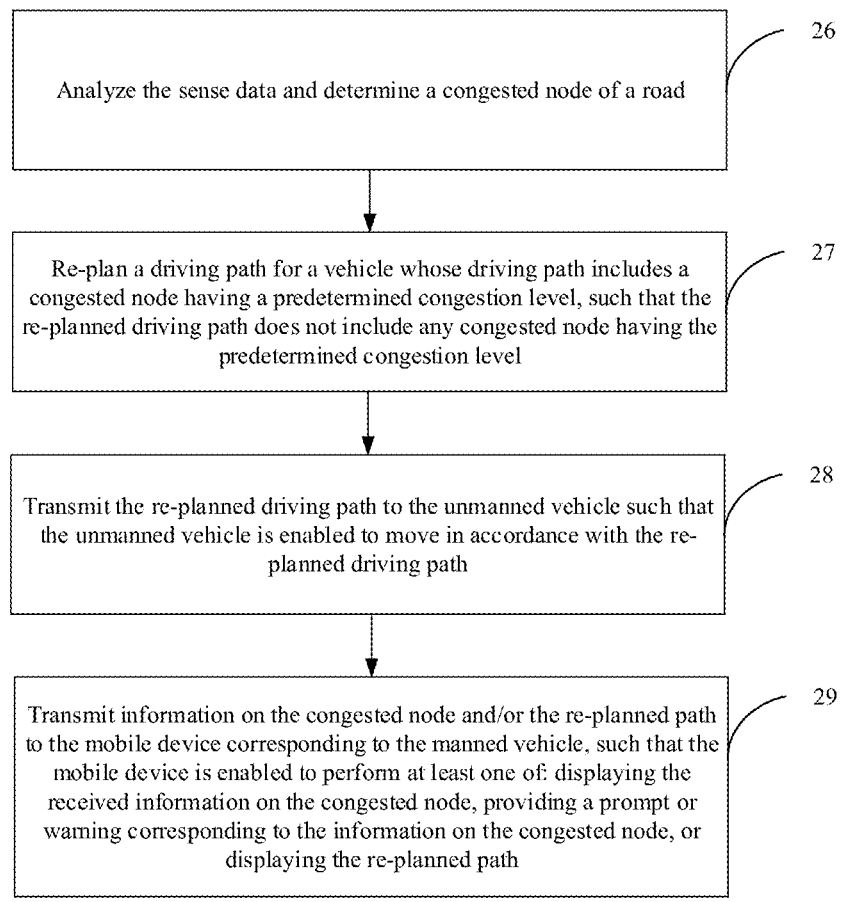
FIG. 3 is another flowchart illustrating a method for planning a driving path for a vehicle according to an embodiment of the present disclosure.

Based on the method shown in FIG. 2, an embodiment of the present disclosure also provides a method for planning a driving path for a vehicle. As shown in FIG. 3, the method further includes the following steps in addition to the process included in FIG. 2.

At step 26, the sense data is analyzed, and a congested node of a road is determined based on a predetermined congestion class. Here, the predetermined congestion class may include a plurality of predetermined congestion levels.

For example, the predetermined congestion class may include three congestion levels: severe congestion, ordinary congestion, and slight congestion, and these three congestion levels correspond to different congestion conditions.

At step 27, a driving path is re-planned for a vehicle whose driving path includes a congested node having a predetermined congestion level, such that the re-planned driving path does not include any congested node having the predetermined congestion level.

For example, when the driving path includes a node having the severe congestion level, the path can be re-planned such that the re-planned driving path does not include any node having the severe congestion level, but may include one or more nodes having the slight congestion level or no congestion.

At step 28, the re-planned driving path is transmitted to the unmanned vehicle such that the unmanned vehicle is enabled to move in accordance with the re-planned driving path.

At step 29, information on the congested node and/or the re-planned path is transmitted to the mobile device corresponding to the manned vehicle, such that the mobile device is enabled to perform at least one of: displaying the received information on the congested node, providing a prompt or warning corresponding to the information on the congested node, or displaying the re-planned path.

That is, the planning device analyzes the sense data, determines a congested node in a road when the road is determined to be congested, and re-plans the driving path for the vehicle whose driving path includes the congested node, such that the unmanned vehicle can move in accordance with the re-planned driving path so as to avoid the congested node. The planning device transmits the information on the congested node and/or the re-planned driving path to the mobile terminal corresponding to the manned vehicle. The mobile terminal displays the information on the congested node and provides a prompt or warning, which can alert the driver of the manned vehicle. The mobile terminal displays the re-planned driving path, which can be used as a reference in road selection by the driver of the manned vehicle, so as to effectively avoid the driver's independent selection of a driving path that may cause a new congestion.

Figure 4:
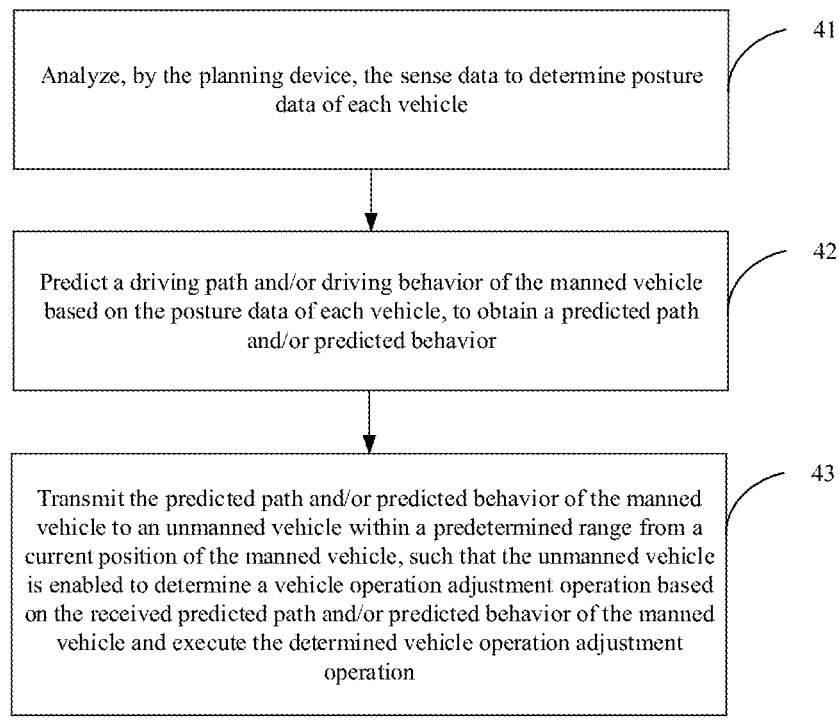
FIG. 4 is yet another flowchart illustrating a method for planning a driving path for a vehicle according to an embodiment of the present disclosure.

Based on the method shown in FIG. 2 or FIG. 3, an embodiment of the present disclosure also provides a method for planning a driving path for a vehicle. As shown in FIG. 4, the method includes the following steps in addition to the method shown in FIG. 2 or FIG. 3.

At step 41, the planning device analyzes the sense data to determine posture data of each vehicle.

At step 42, a driving path and/or driving behavior of the manned vehicle is predicted based on the posture data of each vehicle, to obtain a predicted path and/or predicted behavior.

Here, the driving path of the manned vehicle may be the actual driving path of the manned vehicle. The path may be consistent with the driving path planned by the planning device, or may be the path selected by the driver of the manned vehicle independently, which may be inconsistent with the driving path planned by the planning device.

At step 43, the predicted path and/or predicted behavior of the manned vehicle is transmitted to an unmanned vehicle within a predetermined range from a current position of the manned vehicle, such that the unmanned vehicle is enabled to determine a vehicle operation adjustment operation based on the received predicted path and/or predicted behavior of the manned vehicle and execute the determined vehicle operation adjustment operation.

With the process shown in FIG. 4, the planning device can determine the posture data of the vehicle based on the sense data, and predict the driving path and/or driving behavior of the manned vehicle based on the posture data, to obtain the predicted path and/or predicted behavior. The predicted path and/or predicted behavior can be transmitted to the unmanned vehicle, such that the unmanned vehicle can determine the vehicle operation adjustment operation based on the received predicted path and/or predicted behavior of the manned vehicle and execute the determined vehicle operation adjustment operation. Thus, the unmanned vehicle can better respond to the driving path or driving behavior of the manned vehicle.

Figure 5:
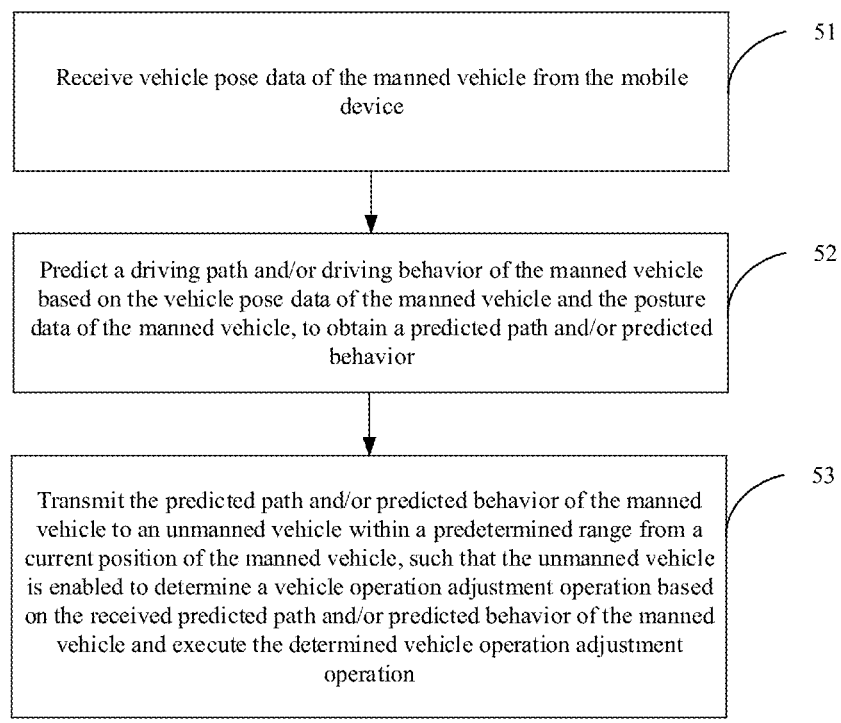
FIG. 5 is still another flowchart illustrating a method for planning a driving path for a vehicle according to an embodiment of the present disclosure.

Similar to the method shown in FIG. 4, an embodiment of the present disclosure also provides a method for planning a driving path for a vehicle. As shown in FIG. 5, the method includes the following steps in addition to the method shown in FIG. 2 or FIG. 3.

At step 51, vehicle pose data of the manned vehicle is received from the mobile device.

At step 52, a driving path and/or driving behavior of the manned vehicle is predicted based on the vehicle pose data of the manned vehicle and the posture data of the manned vehicle, to obtain a predicted path and/or predicted behavior.

At step 53, the predicted path and/or predicted behavior of the manned vehicle is transmitted to an unmanned vehicle within a predetermined range from a current position of the manned vehicle, such that the unmanned vehicle is enabled to determine a vehicle operation adjustment operation based on the received predicted path and/or predicted behavior of the manned vehicle and execute the determined vehicle operation adjustment operation.

When compared with the method shown in FIG. 4, the method shown in FIG. 5 can obtain more accurate vehicle pose data of the manned vehicle, so as to make a more accurate prediction of the driving path and/or driving behavior of the manned vehicle.

Based on the same inventive concept, an embodiment of the present disclosure also provides a device for planning a driving path for a vehicle.

Figure 6:
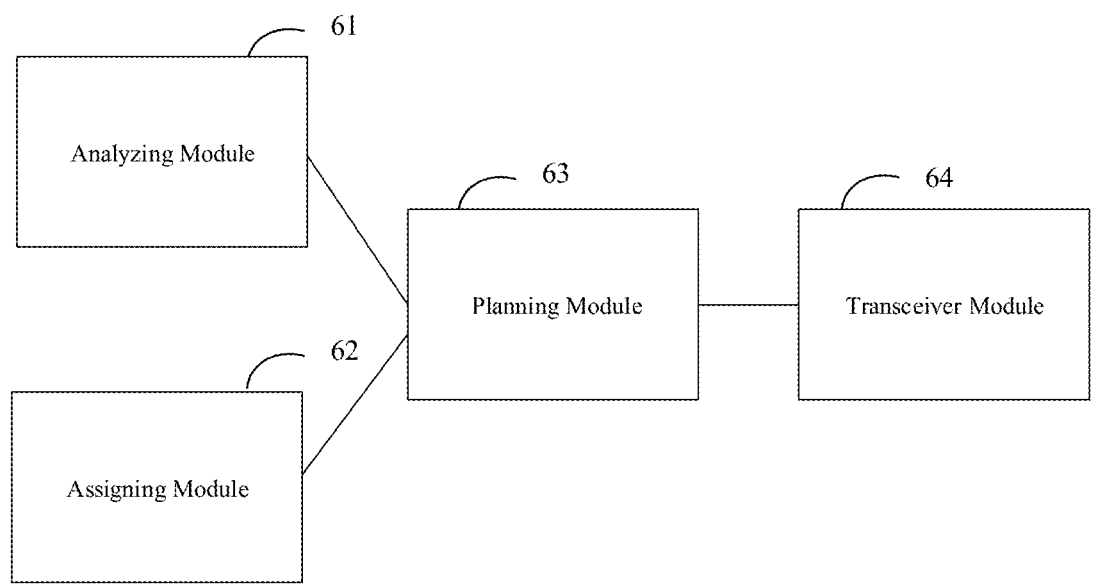
FIG. 6 is a block diagram showing a structure of a device for planning a driving path for a vehicle according to an embodiment of the present disclosure.

As shown in FIG. 6, a device for planning a driving path for a vehicle according to an embodiment of the present disclosure includes the following modules.

An analyzing module 61 is configured to analyze sense data from an area sensing system to obtain positioning data of the vehicles. The sense data is obtained by the area sensing system sensing operating conditions of vehicles in a predetermined area.

An assigning module 62 is configured to assign vehicle transportation tasks to an unmanned vehicle and a manned vehicle in the predetermined area in accordance with a predetermined transportation task. Each vehicle transportation task includes a transportation start point and a transportation end point.

A planning module 63 is configured to plan driving paths for the unmanned vehicle and the manned vehicle based on the assigned vehicle transportation tasks, the vehicle positioning data and map data.

Here, the planning module 63 being configured to plan the driving paths for the unmanned vehicle and the manned vehicle may include the planning module 63 being configured to perform at least one of: planning the driving paths for the manned vehicle and the unmanned vehicle in accordance with predetermined road use permissions and/or road use priorities of the unmanned vehicle and the manned vehicle, respectively; analyzing the sense data to determine traffic data for a current road, and planning the driving paths for the manned vehicle and the unmanned vehicle based on the traffic data for the current road, respectively; or analyzing the sense data to determine a congested node of the current road, and planning the driving paths for the manned vehicle and the unmanned vehicle based on the congested node of the road.

A transceiver module 64 can be configured to transmit the assigned transportation task and the planned driving path for the unmanned vehicle to the unmanned vehicle, such that the unmanned vehicle is enabled to move in accordance with the received driving path and complete the received transportation task, and transmit the assigned transportation task and the planned driving path for the manned vehicle to a mobile device corresponding to the manned vehicle, such that the mobile device is enabled to display the transportation task and the driving path and the manned vehicle is enabled to move in accordance with the driving path and complete the transportation task.

The planning device assigns vehicle transportation tasks for a manned vehicle and an unmanned vehicle, and plans driving paths for the manned vehicle and the unmanned vehicle. The assigned vehicle transportation task and the planned driving path for the unmanned vehicle are assigned to the unmanned vehicle, and the assigned vehicle transport task and the planned driving path for the manned vehicle are assigned to a mobile device corresponding to the manned vehicle, such that the unmanned vehicle and the manned vehicle can move in accordance with the driving paths planned by the planning device and complete the transportation tasks. In this way, it is possible to perform path planning for unmanned vehicles and manned vehicles, respectively, in an environment where the unmanned vehicles and the manned vehicles operate together, thereby solving the problem in the related art that path planning cannot be performed effectively for unmanned vehicles and manned vehicles in an environment where the unmanned vehicles and the manned vehicles operate together.

In some other embodiments of the present disclosure, the planning module 63 can be further configured to analyze the sense data, and determine a congested node of a road based on a predetermined congestion class, the predetermined congestion class including a plurality of predetermined congestion levels; and re-plan a driving path for a vehicle whose driving path includes a congested node having a predetermined congestion level, such that the re-planned driving path does not include any congested node having the predetermined congestion level.

The transceiver module 64 can be further configured to transmit the re-planned driving path to the unmanned vehicle such that the unmanned vehicle is enabled to move in accordance with the re-planned driving path; and transmit information on the congested node and/or the re-planned path to the mobile device corresponding to the manned vehicle, such that the mobile device is enabled to perform at least one of: displaying the received information on the congested node, providing a prompt or warning corresponding to the information on the congested node, or displaying the re-planned path.

The planning device analyzes the sense data, determines a congested node in a road when the road is determined to be congested, and re-plans the driving path for the vehicle whose driving path includes the congested node, such that the unmanned vehicle can move in accordance with the re-planned driving path so as to avoid the congested node. The planning device transmits the information on the congested node and/or the re-planned driving path to the mobile terminal corresponding to the manned vehicle. The mobile terminal displays the information on the congested node and provides a prompt or warning, which can alert the driver of the manned vehicle. The mobile terminal displays the re-planned driving path, which can be used as a reference in road selection by the driver of the manned vehicle, so as to effectively avoid the driver's independent selection of a driving path that may cause a new congestion.

Figure 7:
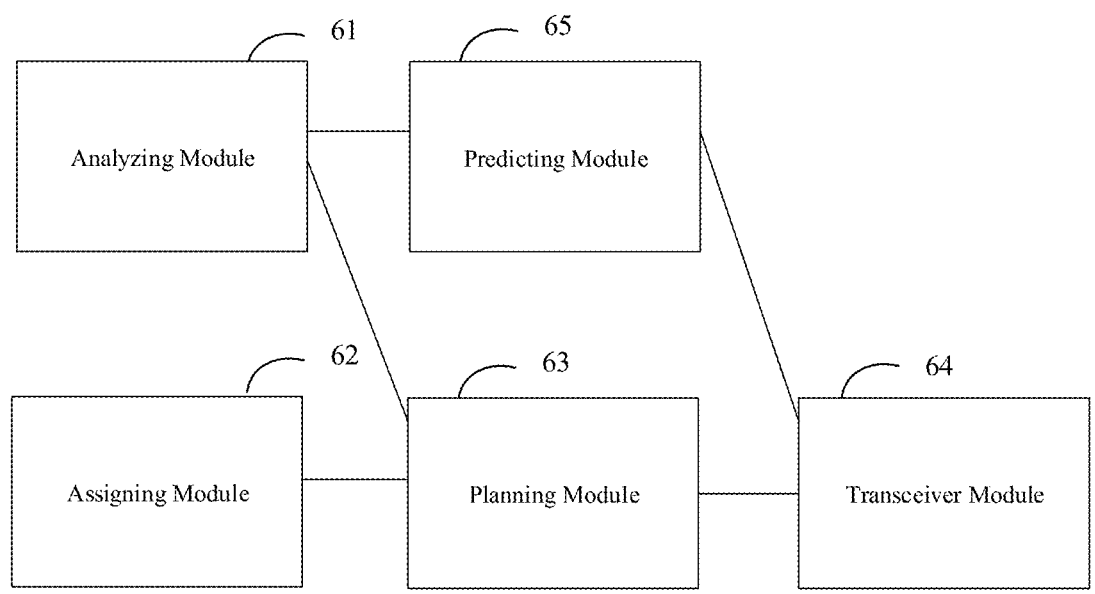
FIG. 7 is another block diagram showing a structure of a system for planning a driving path for a vehicle according to an embodiment of the present disclosure.

In some other embodiments of the present disclosure, as shown in FIG. 7, the device can further include a predicting module 65.

The analyzing module 61 can be further configured to analyze the sense data to determine posture data of each vehicle.

The predicting module 65 can be configured to predict a driving path and/or driving behavior of the manned vehicle based on the posture data of each vehicle, to obtain a predicted path and/or predicted behavior.

The transceiver module 64 can be further configured to transmit the predicted path and/or predicted behavior of the manned vehicle to an unmanned vehicle within a predetermined range from a current position of the manned vehicle, such that the unmanned vehicle is enabled to determine a vehicle operation adjustment operation based on the received predicted path and/or predicted behavior of the manned vehicle and execute the determined vehicle operation adjustment operation.

The planning device determines the posture data of the vehicle based on the sense data, and predicts the driving path and/or driving behavior of the manned vehicle based on the posture data, to obtain the predicted path and/or predicted behavior. The predicted path and/or predicted behavior is transmitted to the unmanned vehicle, such that the unmanned vehicle can determine the vehicle operation adjustment operation based on the received predicted path and/or predicted behavior of the manned vehicle and execute the determined vehicle operation adjustment operation. Thus, the unmanned vehicle can better respond to the driving path or driving behavior of the manned vehicle.

In some other embodiments of the present disclosure, the transceiver module 64 can be further configured to receive vehicle pose data of the manned vehicle from the mobile device. The predicting module 65 being configured to predict the driving path and/or driving behavior of the manned vehicle may include the predicting module 65 being configured to predict the driving path and/or driving behavior of the manned vehicle based on the vehicle pose data of the manned vehicle and the posture data of the manned vehicle, to obtain the predicted path and/or predicted behavior.

The planning device receives the vehicle pose data from the mobile device corresponding to the manned vehicle, and can obtain more accurate vehicle pose data of the manned vehicle, so as to make a more accurate prediction of the driving path and/or driving behavior of the manned vehicle.

Based on the same inventive concept, an embodiment of the present disclosure also provides a device for planning a driving path for a vehicle.

Figure 8:
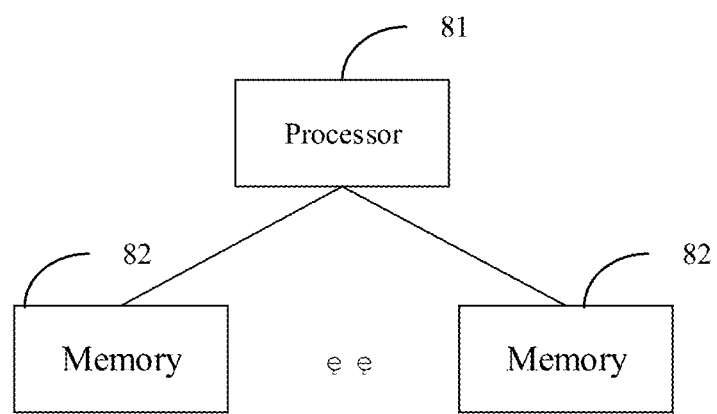
FIG. 8 is yet another block diagram showing a structure of a system for planning a driving path for a vehicle according to an embodiment of the present disclosure.

As shown in FIG. 8, a device for planning a driving path for a vehicle according to an embodiment of the present disclosure includes a processor 81 and at least one memory 82 storing at least one machine executable instruction. The processor 81 is operative to execute the at least one machine executable instruction to: analyze sense data from an area sensing system to obtain positioning data of the vehicles, the sense data being obtained by the area sensing system sensing operating conditions of vehicles in a predetermined area; assign vehicle transportation tasks to an unmanned vehicle and a manned vehicle in the predetermined area in accordance with a predetermined transportation task, each vehicle transportation task including a transportation start point and a transportation end point; plan driving paths for the unmanned vehicle and the manned vehicle based on the assigned vehicle transportation tasks, the vehicle positioning data and map data; transmit the assigned transportation task and the planned driving path for the unmanned vehicle to the unmanned vehicle, such that the unmanned vehicle is enabled to move in accordance with the received driving path and complete the received transportation task; and transmit the assigned transportation task and the planned driving path for the manned vehicle to a mobile device corresponding to the manned vehicle, such that the mobile device is enabled to display the transportation task and the driving path and the manned vehicle is enabled to move in accordance with the driving path and complete the transportation task.

Here, the processor 81 being operative to execute the at least one machine executable instruction to plan the driving paths for the unmanned vehicle and the manned vehicle may include the processor 81 being operative to execute the at least one machine executable instruction to perform at least one of: planning the driving paths for the manned vehicle and the unmanned vehicle in accordance with predetermined road use permissions and/or road use priorities of the unmanned vehicle and the manned vehicle, respectively; analyzing the sense data to determine traffic data for a current road, and planning the driving paths for the manned vehicle and the unmanned vehicle based on the traffic data for the current road, respectively; or analyzing the sense data to determine a congested node of the current road, and planning the driving paths for the manned vehicle and the unmanned vehicle based on the congested node of the road.

The planning device assigns vehicle transportation tasks for a manned vehicle and an unmanned vehicle, and plans driving paths for the manned vehicle and the unmanned vehicle. The assigned vehicle transportation task and the planned driving path for the unmanned vehicle are assigned to the unmanned vehicle, and the assigned vehicle transport task and the planned driving path for the manned vehicle are assigned to a mobile device corresponding to the manned vehicle, such that the unmanned vehicle and the manned vehicle can move in accordance with the driving paths planned by the planning device and complete the transportation tasks. In this way, it is possible to perform path planning for unmanned vehicles and manned vehicles, respectively, in an environment where the unmanned vehicles and the manned vehicles operate together, thereby solving the problem in the related art that path planning cannot be performed effectively for unmanned vehicles and manned vehicles in an environment where the unmanned vehicles and the manned vehicles operate together.

In some other embodiments of the present disclosure, the processor 81 can be further operative to execute the at least one machine executable instruction to: analyze the sense data, and determine a congested node of a road based on a predetermined congestion class, the predetermined congestion class including a plurality of predetermined congestion levels; re-plan a driving path for a vehicle whose driving path includes a congested node having a predetermined congestion level, such that the re-planned driving path does not include any congested node having the predetermined congestion level; transmit the re-planned driving path to the unmanned vehicle such that the unmanned vehicle is enabled to move in accordance with the re-planned driving path; and transmit information on the congested node and/or the re-planned path to the mobile device corresponding to the manned vehicle, such that the mobile device is enabled to perform at least one of: displaying the received information on the congested node, providing a prompt or warning corresponding to the information on the congested node, or displaying the re-planned path.

The planning device analyzes the sense data, determines a congested node in a road when the road is determined to be congested, and re-plans the driving path for the vehicle whose driving path includes the congested node, such that the unmanned vehicle can move in accordance with the re-planned driving path so as to avoid the congested node. The planning device transmits the information on the congested node and/or the re-planned driving path to the mobile terminal corresponding to the manned vehicle. The mobile terminal displays the information on the congested node and provides a prompt or warning, which can alert the driver of the manned vehicle. The mobile terminal displays the re-planned driving path, which can be used as a reference in road selection by the driver of the manned vehicle, so as to effectively avoid the driver's independent selection of a driving path that may cause a new congestion.

In some other embodiments of the present disclosure, the processor 81 can be further operative to execute the at least one machine executable instruction to: analyze the sense data to determine posture data of each vehicle; predict a driving path and/or driving behavior of the manned vehicle based on the posture data of each vehicle, to obtain a predicted path and/or predicted behavior; and transmit the predicted path and/or predicted behavior of the manned vehicle to an unmanned vehicle within a predetermined range from a current position of the manned vehicle, such that the unmanned vehicle is enabled to determine a vehicle operation adjustment operation based on the received predicted path and/or predicted behavior of the manned vehicle and execute the determined vehicle operation adjustment operation.

The planning device determines the posture data of the vehicle based on the sense data, and predicts the driving path and/or driving behavior of the manned vehicle based on the posture data, to obtain the predicted path and/or predicted behavior. The predicted path and/or predicted behavior is transmitted to the unmanned vehicle, such that the unmanned vehicle can determine the vehicle operation adjustment operation based on the received predicted path and/or predicted behavior of the manned vehicle, and execute the determined vehicle operation adjustment operation. Thus, the unmanned vehicle can better respond to the driving path or driving behavior of the manned vehicle.

In other embodiments of the present disclosure, the processor 81 can be further operative to execute the at least one machine executable instruction to receive vehicle pose data of the manned vehicle from the mobile device. The processor 81 being operative to execute the at least one machine executable instruction to predict the driving path and/or driving behavior of the manned vehicle may include the processor 81 being operative to execute the at least one machine executable instruction to predict the driving path and/or driving behavior of the manned vehicle based on the vehicle pose data of the manned vehicle and the posture data of the manned vehicle, to obtain the predicted path and/or predicted behavior.

The planning device receives the vehicle pose data from the mobile device corresponding to the manned vehicle, and can obtain more accurate vehicle pose data of the manned vehicle, so as to make a more accurate prediction of the driving path and/or driving behavior of the manned vehicle.

The basic principles of the present disclosure have been described above with reference to the embodiments. However, it can be appreciated by those skilled in the art that all or any of the steps or components of the method or device according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have been described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A system for planning a driving path for a vehicle, comprising an area sensing system, a planning device, and a mobile device corresponding to a manned vehicle, wherein
the area sensing system, which includes at least one laser radar, is configured to sense operating conditions of vehicles in a predetermined area to obtain sense data, and transmit the sense data to the planning device;
the planning device is configured to: analyze the sense data to obtain positioning data of the vehicles; assign vehicle transportation tasks to an unmanned vehicle and the manned vehicle in the predetermined area in accordance with a predetermined transportation task, each vehicle transportation task including a transportation start point and a transportation end point; plan driving paths for the unmanned vehicle and the manned vehicle based on the assigned vehicle transportation tasks, the vehicle positioning data and map data; transmit the assigned transportation task and the planned driving path for the unmanned vehicle to the unmanned vehicle, such that the unmanned vehicle is enabled to move in accordance with the received driving path and complete the received transportation task; and transmit the assigned transportation task and the planned driving path for the manned vehicle to the mobile device corresponding to the manned vehicle; and
the mobile device, which is temporarily assigned to the manned vehicle, is configured to receive the transportation task and the driving path from the planning device, and display the transportation task and the driving path, such that the manned vehicle is enabled to move in accordance with the driving path displayed by the mobile device and complete the transportation task displayed by the mobile device, wherein the planning device is further configured to:
analyze the sense data to obtain posture data of the manned vehicle;
predict, in response to the driving path for the manned vehicle being inconsistent from a driving path determined by a driver of the manned vehicle, a driving path of the manned vehicle based on the posture data of the manned vehicle, to obtain a predicted path of the manned vehicle; and
determine, based on the predicted path of the manned vehicle, an adjustment of vehicle operation for the unmanned vehicle.

2. The system of claim 1, wherein the planning device being configured to plan the driving paths for the unmanned vehicle and the manned vehicle comprises the planning device being configured to perform at least one of:
planning the driving paths for the manned vehicle and the unmanned vehicle in accordance with predetermined road use permissions or road use priorities of the unmanned vehicle and the manned vehicle, respectively;
analyzing the sense data to determine traffic data for a current road, and planning the driving paths for the manned vehicle and the unmanned vehicle based on the traffic data for the current road, respectively; or analyzing the sense data to determine a congested node of the current road, and planning the driving paths for the manned vehicle and the unmanned vehicle based on the congested node of the road.

3. The system of claim 1, wherein the planning device is further configured to:

analyze the sense data, and determine a congested node of a road based on a predetermined congestion class, wherein the predetermined congestion class comprises a plurality of predetermined congestion levels;

re-plan a driving path for a vehicle whose driving path includes a congested node having a predetermined congestion level, such that the re-planned driving path does not include any congested node having the predetermined congestion level;

transmit the re-planned driving path to the unmanned vehicle such that the unmanned vehicle is enabled to move in accordance with the re-planned driving path; and transmit information on the congested node or the re-planned path to the mobile device corresponding to the manned vehicle, such that the mobile device is enabled to perform at least one of: displaying the received information on the congested node, providing a prompt or warning corresponding to the information on the congested node, or displaying the re-planned path.

4. The system of claim 1, wherein the planning device is further configured to:

analyze the sense data to determine posture data of each vehicle;

predict a driving path or driving behavior of the manned vehicle based on the posture data of each vehicle, to obtain a predicted path or predicted behavior; and transmit the predicted path or predicted behavior of the manned vehicle to an unmanned vehicle within a predetermined range from a current position of the manned vehicle, such that the unmanned vehicle is enabled to determine a vehicle operation adjustment operation based on the received predicted path or predicted behavior of the manned vehicle and execute the determined vehicle operation adjustment operation.

5. The system of claim 4, wherein the mobile device further comprises a positioning unit and an inertial measurement unit, wherein the mobile device is further configured to generate vehicle pose data based on a measurement result from the positioning unit and a measurement result from the inertial measurement unit while the manned vehicle is moving, and transmit the vehicle pose data of the manned vehicle to the planning device, and the planning device is further configured to receive the vehicle pose data of the manned vehicle from the mobile device, and wherein the planning device being configured to predict the driving path or driving behavior of the manned vehicle comprises the planning device being configured to predict the driving path or driving behavior of the manned vehicle based on the vehicle pose data of the manned vehicle and the posture data of the manned vehicle, to obtain the predicted path or predicted behavior.

6. A method for planning a driving path for a vehicle, comprising:

analyzing, by a planning device, sense data from an area sensing system to obtain positioning data of the vehicles, the sense data being obtained by the area sensing system which includes at least one laser radar sensing operating conditions of vehicles in a predetermined area;

assigning vehicle transportation tasks to an unmanned vehicle and a manned vehicle in the predetermined area in accordance with a predetermined transportation task, each vehicle transportation task including a transportation start point and a transportation end point;

planning driving paths for the unmanned vehicle and the manned vehicle based on the assigned vehicle transportation tasks, the vehicle positioning data and map data;

transmitting the assigned transportation task and the planned driving path for the unmanned vehicle to the unmanned vehicle, such that the unmanned vehicle is enabled to move in accordance with the received driving path and complete the received transportation task; and transmitting the assigned transportation task and the planned driving path for the manned vehicle to a mobile device temporarily assigned to the manned vehicle, such that the mobile device is enabled to display the transportation task and the driving path and the manned vehicle is enabled to move in accordance with the driving path and complete the transportation task;

analyzing the sense data to obtain posture data of the manned vehicle;

predicting, in response to the driving path for the manned vehicle being inconsistent from a driving path determined by a driver of the manned vehicle, a driving path of the manned vehicle based on the posture data of the manned vehicle, to obtain a predicted path of the manned vehicle; and determining, based on the predicted path of the manned vehicle, an adjustment of vehicle operation for the unmanned vehicle.

7. The method of claim 6, wherein said planning the driving paths for the unmanned vehicle and the manned vehicle comprises at least one of:

planning the driving paths for the manned vehicle and the unmanned vehicle in accordance with predetermined road use permissions or road use priorities of the unmanned vehicle and the manned vehicle, respectively;

analyzing the sense data to determine traffic data for a current road, and planning the driving paths for the manned vehicle and the unmanned vehicle based on the traffic data for the current road, respectively; or analyzing the sense data to determine a congested node of the current road, and planning the driving paths for the manned vehicle and the unmanned vehicle based on the congested node of the road.

8. The method of claim 6, further comprising:

analyzing the sense data, and determining a congested node of a road based on a predetermined congestion class, wherein the predetermined congestion class comprises a plurality of predetermined congestion levels;

re-planning a driving path for a vehicle whose driving path includes a congested node having a predetermined congestion level, such that the re-planned driving path does not include any congested node having the predetermined congestion level;

transmitting the re-planned driving path to the unmanned vehicle such that the unmanned vehicle is enabled to move in accordance with the re-planned driving path; and transmitting information on the congested node or the re-planned path to the mobile device corresponding to the manned vehicle, such that the mobile device is enabled to perform at least one of: displaying the received information on the congested node, providing a prompt or warning corresponding to the information on the congested node, or displaying the re-planned path.

9. The method of claim 6, further comprising:

analyzing the sense data to determine posture data of each vehicle;

predicting a driving path or driving behavior of the manned vehicle based on the posture data of each vehicle, to obtain a predicted path or predicted behavior; and transmitting the predicted path or predicted behavior of the manned vehicle to an unmanned vehicle within a predetermined range from a current position of the manned vehicle, such that the unmanned vehicle is enabled to determine a vehicle operation adjustment operation based on the received predicted path or predicted behavior of the manned vehicle and execute the determined vehicle operation adjustment operation.

10. The method of claim 9, further comprising:

receiving vehicle pose data of the manned vehicle from the mobile device, wherein said predicting the driving path or driving behavior of the manned vehicle comprises predicting the driving path or driving behavior of the manned vehicle based on the vehicle pose data of the manned vehicle and the posture data of the manned vehicle, to obtain the predicted path or predicted behavior.

11. A device for planning a driving path for a vehicle, comprising:

an analyzing module configured to analyze sense data from an area sensing system, which includes at least one laser radar, to obtain positioning data of the vehicles, the sense data being obtained by the area sensing system sensing operating conditions of vehicles in a predetermined area;

an assigning module configured to assign vehicle transportation tasks to an unmanned vehicle and a manned vehicle in the predetermined area in accordance with a predetermined transportation task, each vehicle transportation task including a transportation start point and a transportation end point;

a planning module configured to plan driving paths for the unmanned vehicle and the manned vehicle based on the assigned vehicle transportation tasks, the vehicle positioning data and map data;

a transceiver module configured to transmit the assigned transportation task and the planned driving path for the unmanned vehicle to the unmanned vehicle, such that the unmanned vehicle is enabled to move in accordance with the received driving path and complete the received transportation task, and transmit the assigned transportation task and the planned driving path for the manned vehicle to a mobile device temporarily assigned to the manned vehicle, such that the mobile device is enabled to display the transportation task and the driving path and the manned vehicle is enabled to move in accordance with the driving path and complete the transportation task, wherein the planning module is further configured to:

analyze the sense data to obtain posture data of the manned vehicle;

predict, in response to the driving path for the manned vehicle being inconsistent from a driving path determined by a driver of the manned vehicle, a driving path of the manned vehicle based on the posture data of the manned vehicle, to obtain a predicted path of the manned vehicle; and determine, based on the predicted path of the manned vehicle, an adjustment of vehicle operation for the unmanned vehicle.

12. The device of claim 11, wherein the planning module being configured to plan the driving paths for the unmanned vehicle and the manned vehicle comprises the planning module being configured to perform at least one of:

planning the driving paths for the manned vehicle and the unmanned vehicle in accordance with predetermined road use permissions or road use priorities of the unmanned vehicle and the manned vehicle, respectively;

analyzing the sense data to determine traffic data for a current road, and planning the driving paths for the manned vehicle and the unmanned vehicle based on the traffic data for the current road, respectively; or analyzing the sense data to determine a congested node of the current road, and planning the driving paths for the manned vehicle and the unmanned vehicle based on the congested node of the road.

13. The device of claim 11, wherein the planning module is further configured to analyze the sense data, and determine a congested node of a road based on a predetermined congestion class, wherein the predetermined congestion class comprises a plurality of predetermined congestion levels; and re-plan a driving path for a vehicle whose driving path includes a congested node having a predetermined congestion level, such that the re-planned driving path does not include any congested node having the predetermined congestion level, and the transceiver module is further configured to transmit the re-planned driving path to the unmanned vehicle such that the unmanned vehicle is enabled to move in accordance with the re-planned driving path; and transmit information on the congested node or the re-planned path to the mobile device corresponding to the manned vehicle, such that the mobile device is enabled to perform at least one of: displaying the received information on the congested node, providing a prompt or warning corresponding to the information on the congested node, or displaying the re-planned path.

14. The device of claim 11, further comprising a predicting module, wherein the analyzing module is further configured to analyze the sense data to determine posture data of each vehicle, the predicting module is configured to predict a driving path or driving behavior of the manned vehicle based on the posture data of each vehicle, to obtain a predicted path or predicted behavior, and the transceiver module is further configured to transmit the predicted path or predicted behavior of the manned vehicle to an unmanned vehicle within a predetermined range from a current position of the manned vehicle, such that the unmanned vehicle is enabled to determine a vehicle operation adjustment operation based on the received predicted path or predicted behavior of the manned vehicle and execute the determined vehicle operation adjustment operation.

15. The device of claim 14, wherein the transceiver module is further configured to receive vehicle pose data of the manned vehicle from the mobile device, and
the predicting module being configured to predict the driving path or driving behavior of the manned vehicle comprises the predicting module being configured to predict the driving path or driving behavior of the manned vehicle based on the vehicle pose data of the manned vehicle and the posture data of the manned vehicle, to obtain the predicted path or predicted behavior.

16. A device for planning a driving path for a vehicle, comprising: a processor and at least one memory storing at least one machine executable instruction, the processor being operative to execute the at least one machine executable instruction to:
analyze sense data from an area sensing system, which includes at least one laser radar, to obtain positioning data of the vehicles, the sense data being obtained by the area sensing system sensing operating conditions of vehicles in a predetermined area;
assign vehicle transportation tasks to an unmanned vehicle and a manned vehicle in the predetermined area in accordance with a predetermined transportation task, each vehicle transportation task including a transportation start point and a transportation end point;
plan driving paths for the unmanned vehicle and the manned vehicle based on the assigned vehicle transportation tasks, the vehicle positioning data and map data;
transmit the assigned transportation task and the planned driving path for the unmanned vehicle to the unmanned vehicle, such that the unmanned vehicle is enabled to move in accordance with the received driving path and complete the received transportation task; and
transmit the assigned transportation task and the planned driving path for the manned vehicle to a mobile device temporarily assigned to the manned vehicle, such that the mobile device is enabled to display the transportation task and the driving path and the manned vehicle is enabled to move in accordance with the driving path and complete the transportation task, wherein the processor is further operative to execute the at least one machine executable instruction to:
analyze the sense data to obtain posture data of the manned vehicle;
predict, in response to the driving path for the manned vehicle being inconsistent from a driving path determined by a driver of the manned vehicle, a driving path of the manned vehicle based on the posture data of the manned vehicle, to obtain a predicted path of the manned vehicle; and
determine, based on the predicted path of the manned vehicle, an adjustment of vehicle operation for the unmanned vehicle.

17. The device of claim 16, wherein the processor being operative to execute the at least one machine executable instruction to plan the driving paths for the unmanned vehicle and the manned vehicle comprises the processor being operative to execute the at least one machine executable instruction to perform at least one of:
planning the driving paths for the manned vehicle and the unmanned vehicle in accordance with predetermined road use permissions or road use priorities of the unmanned vehicle and the manned vehicle, respectively;
analyzing the sense data to determine traffic data for a current road, and planning the driving paths for the manned vehicle and the unmanned vehicle based on the traffic data for the current road, respectively; or
analyzing the sense data to determine a congested node of the current road, and planning the driving paths for the manned vehicle and the unmanned vehicle based on the congested node of the road.

18. The device of claim 16, wherein the processor is further operative to execute the at least one machine executable instruction to:
analyze the sense data, and determine a congested node of a road based on a predetermined congestion class, wherein the predetermined congestion class comprises a plurality of predetermined congestion levels;
re-plan a driving path for a vehicle whose driving path includes a congested node having a predetermined congestion level, such that the re-planned driving path does not include any congested node having the predetermined congestion level;
transmit the re-planned driving path to the unmanned vehicle such that the unmanned vehicle is enabled to move in accordance with the re-planned driving path; and
transmit information on the congested node or the re-planned path to the mobile device corresponding to the manned vehicle, such that the mobile device is enabled to perform at least one of: displaying the received information on the congested node, providing a prompt or warning corresponding to the information on the congested node, or displaying the re-planned path.

19. The device of claim 16, wherein the processor is further operative to execute the at least one machine executable instruction to:
analyze the sense data to determine posture data of each vehicle;
predict a driving path or driving behavior of the manned vehicle based on the posture data of each vehicle, to obtain a predicted path or predicted behavior; and
transmit the predicted path or predicted behavior of the manned vehicle to an unmanned vehicle within a predetermined range from a current position of the manned vehicle, such that the unmanned vehicle is enabled to determine a vehicle operation adjustment operation based on the received predicted path or predicted behavior of the manned vehicle and execute the determined vehicle operation adjustment operation.

20. The device of claim 19, wherein the processor is further operative to execute the at least one machine executable instruction to receive vehicle pose data of the manned vehicle from the mobile device,
wherein the processor being operative to execute the at least one machine executable instruction to predict the driving path or driving behavior of the manned vehicle comprises the processor being operative to execute the at least one machine executable instruction to predict the driving path or driving behavior of the manned vehicle based on the vehicle pose data of the manned vehicle and the posture data of the manned vehicle, to obtain the predicted path or predicted behavior.

* * * * *